UNITED STATES PATENT OFFICE.

JAMES B. JOHNSTON, OF NEW YORK, N. Y.

IMPROVEMENT IN CHECKS, BANK-NOTES, &c.

Specification forming part of Letters Patent No. 174,536, dated March 7, 1876; application filed July 23, 1873.

*To all whom it may concern:*

Be it known that I, JAMES B. JOHNSTON, of the city, county, and State of New York, have invented a new and Improved Check, Money-Order, Bank-Note, or Draft; and I do hereby declare the following to be a full, clear, and exact description thereof, which will enable others skilled in the art to which my invention appertains to manufacture and use the same.

My invention has for its object to provide a check, money-order, bank-note, or draft which shall draw interest from the date of its issue, and thereby secure to the operative or other holder all the advantages of a savings-bank deposit, without the disadvantages attending the placing of money in an established or ordinary savings-bank. It is designed for use more especially by large firms or corporations in paying their employés, for the purpose of enabling the latter to receive interest upon their wages or salaries, in small amounts, from the date of payment. To this end the invention consists in a check, money-order, bank-note, or draft, payable upon presentation or demand, and provided with interest-coupons payable when the interest upon each has accrued, the whole being properly secured and the security expressed upon the check.

In carrying out the invention the checks are issued in denominations of five, ten, twenty, fifty, and one hundred dollars, or other small sums, and provided with interest-coupons covering the interest at a fixed rate on the amount stated on the face of the check for one year, and due in three, six, nine, and twelve months, or at other stated times. The security for the holder is expressed in any convenient place upon the check, generally upon the back, and is preferably by hypothecation, to a third party, of a certain amount of mortgage-bonds on the real estate of the drawer, or by other property of the drawer. The check is good for its face at any time upon demand, and if held until an interest-coupon becomes due it will be good for its face and interest at the rate of a certain per cent. per annum. If a coupon is cut off before it is due the check will not be paid until the missing coupon is returned or becomes due, and when the last coupon is due the check may be collected, or exchanged for a new one with coupons for another year or additional period of time. The coupon-check in effect puts an employé's money into a savings-bank as soon as received, and yet can be at once exchanged for money, if preferred. Savings-banks do not, as a rule, pay interest from the time a deposit is made, unless the money is allowed to remain a certain length of time.

By my improved coupon-check the moment an employé receives his wages or salary it begins to draw interest, without any effort of his, and, in addition, avoids the time and trouble of making a deposit in the savings-bank. The use of the check, therefore, becomes of great value to employés, as it encourages them to save a certain amount of money every week or month, or other pay-day. They readily understand that by holding the check it will pay them a certain interest every few months, whereas if they received their entire wages in money they would be more likely to spend it, because of the time and trouble attending its deposit in a savings-bank, and they are further led to hold the check by the knowledge that in the event of sickness or discharge the face of the check will be paid upon demand. In another respect the checks tend to the advantage of employés, because they may be transferred by delivery only from one to another, upon payment of the face of the check and the accrued interest, so that a workman leaving the employ of the company, or becoming incapacitated for work from any cause, will realize something from the checks in addition to their face.

I am aware that bonds and certificates of deposit are provided with interest-coupons; but neither of these includes the principle of my invention, nor do they meet the wants of employés who receive small wages. The principal or face of the bonds is not payable upon demand, and can only be realized by the bond-holder after all the interest-coupons have become due, generally after the expiration of a number of years, while the certificate of deposit only pays interest after a certain length of time from its issue, and never is the face of the certificate paid without a surrender of the interest-coupons.

Having thus described my invention, what I claim as new is—

A check, money-order, bank-note, or draft having on its face words indicating its payment on demand, and having interest-bearing coupons attached, substantially as herein described and shown.

JAS. B. JOHNSTON.

Witnesses:
   FRANCIS N. SHEPARD,
   ISIDOR GRAYHEAD.